United States Patent [19]

Fuji

[11] 3,953,541

[45] Apr. 27, 1976

[54] PROCESS FOR PREPARATION OF POLYOLEFIN GRAFT COPOLYMERS

[75] Inventor: Saburo Fuji, Ohtake, Japan

[73] Assignee: Mitsui Petrochemical Industries Ltd., Tokyo, Japan

[22] Filed: July 17, 1974

[21] Appl. No.: 489,249

[30] Foreign Application Priority Data
July 20, 1973    Japan.............................. 48-81899

[52] U.S. Cl............................. 260/878 R; 260/879
[51] Int. Cl.$^2$................ C08L 23/26; C08F 255/02; C08F 255/08
[58] Field of Search........................ 260/878 R, 879

[56] References Cited
UNITED STATES PATENTS

| | | | |
|---|---|---|---|
| 3,489,822 | 1/1970 | Witt et al. ....................... | 260/878 R |
| 3,542,721 | 11/1970 | Minekawa et al............... | 260/878 R |
| 3,551,522 | 12/1970 | Miles et al. ..................... | 260/878 R |
| 3,671,608 | 6/1972 | Meredith et al. ................ | 260/878 R |
| 3,683,500 | 8/1972 | Meredith et al. ................ | 260/878 R |
| 3,694,522 | 9/1972 | Tsuruta et al.................... | 260/878 R |
| 3,793,260 | 2/1974 | Westermann .................... | 260/878 R |

*Primary Examiner*—Alan Holler
*Attorney, Agent, or Firm*—Sherman & Shalloway

[57] ABSTRACT

A process for preparing a polyolefin graft copolymer, which comprises subjecting a copolymer selected from the group consisting of copolymers of ethylene with diolefins and copolymers of $C_3$ to $C_8$ $\alpha$-olefins with diolefins and containing 2 to 40 double bonds per 1000 monomeric units therein and a monomer radical graft-copolymerizable onto said copolymer to a suspension graft copolymerization in the presence of a radical initiator in an inert organic solvent capable of dissolving said radical-polymerizable monomer but incapable of dissolving said graft copolymer and of reacting therewith, at a temperature at which said copolymer is not melted.

17 Claims, No Drawings

PROCESS FOR PREPARATION OF POLYOLEFIN GRAFT COPOLYMERS

This invention relates to a process for preparing a polyolefin graft copolymer, which can furnish a polyolefin with various improved properties such as adhesiveness, printability, dyeability, hydrophilicity, antistatic property, soiling resistance, blocking resistance or dispersibility of an additive therein. According to this process, the operations of grafting reactions and of separating and collecting the graft copolymer are easy, and a graft copolymer can be produced at low temperatures without involving side-reactions and also with a good efficiency of utilizing a grafting comonomer and in superior grafting yields.

More specifically, this invention relates to a process for preparing a polyolefin graft copolymer, which comprises subjecting a copolymer selected from the group consisting of copolymers of ethylene with diolefins and copolymers of $C_3$ to $C_8$ $\alpha$-olefins with diolefins and containing 2 to 40 double bonds per 1000 monomeric units therein and a monomer radical graft-copolymerizable onto said copolymer to a suspension graft copolymerization in the presence of a radical initiator in an inert organic solvent capable of dissolving said radical-polymerizable monomer but incapable of dissolving said graft copolymer and of reacting therewith, at a temperature at which said copolymer is not melted.

In order to modify highly crystalline polyolefins, attempts have previously been made to graft them with a comonomer capable of being grafted onto the polyolefin, such as a vinyl grafting comonomer or maleic acid grafting comonomer. However, since such polyolefins, especially those having high crystallinity, have poor graft co-polymerizability, it is extremely difficult to graft-copolymerize the comonomer in an amount sufficient to achieve the desired modification. With a view to overcoming this difficulty, a method was proposed in which a polyolefin is irradiated with an actinic ray such as radioactive rays or ultraviolet rays or pre-treated with ozone, and then a grafting comonomer is polymerized onto it. Methods involving these pretreating steps have operational disadvantages, and suffer from the defect of requiring complicated and expensive equipment. Furthermore, when sufficient pre-treatments are carried out in an attempt to achieve a sufficient improvement in grafting conversion rates, the degradation of the polyolefin per se and other adverse effects occur.

In order to avoid such disadvantages of the methods requiring these pre-treatments, methods have been prevalent in which a grafting comonomer is graft copolymerized onto a polyolefin in the presence of a radical initiator in a solvent capable of dissolving the crystalline polyolefin. However, in order to dissolve the polyolefin, it is necessary to use a great amount of the solvent, and operate the method at high temperatures. This results in the disadvantage of requiring complicated steps in separating and recovering the desired final product from the reaction mixture containing the solvent, grafted polyolefin, the unreacted grafting comonomer, a homopolymer of the comonomer, and the reaction product formed between the comonomer and the solvent, and treating the solvent after separation of the desired product. Moreover, at high temperatures, side-reactions such as the chain transfer of radicals to the solvent and the grafting comonomer tend to occur, and part of the comonomer used is consumed in the side-reactions. As a result, the grafting yield and the efficiency of utilizing the comonomer are both reduced.

There was also proposed a method in which polyethylene and a maleic acid such as maleic anhydride and if desired, a small amount of a radical initiator such as a peroxide are melted and masticated in an extruder to form maleic-modified polyethylene. However, according to this method, the unreacted maleic acid remains in the polyethylene resin, and therefore, the resulting grafted copolymer cannot be used as a material for tableware or packing materials, or the polyethylene is degraded by the peroxide in the extruder. Because of these defects, maleic-modified polyethylene suitable for practical applications cannot be obtained.

We made investigations in order to remove the above-mentioned defects and disadvantages associated with the modification of polyolefins by graft polymerization, and consequently found that when an olefin copolymer containing a diolefin is used as the starting polyolefin and subjected to a suspension graft copolymerization in the presence of a radical initiator in an inert organic solvent capable of dissolving a grafting comonomer but incapable of dissolving the copolymer and the grafting comonomer, i.e., graft copolymer, and of reacting with the comonomer and the copolymer, i.e., graft copolymer, at a temperature at which the copolymer is not melted, the graft-copolymerization can proceed easily. We also found that by employing such a suspension graft copolymerization at low temperatures, the above-described defects and disadvantages of the conventional methods can be avoided, and polyolefin graft copolymers having superior improved properties can be produced with good reproducibility of quality in superior grafting yields and with good efficiencies of utilizing the grafting comonomer while permitting easy grafting reaction operations and easy separation and recovery of the resulting graft copolymers.

Accordingly, it is an object of this invention to provide a process for preparing a polyolefin graft copolymer having improved properties on a commercial basis and with good reproducibility of quality, while avoiding the defects and disadvantages of the conventional processes.

Many other objects and advantages of this invention will become more apparent from the following description.

The starting copolymer used in this invention is one selected from the group consisting of copolymers of ethylene with diolefins, preferably butadiene, and copolymers of $C_3$ to $C_8$ $\alpha$-olefins with diolefins, preferably butadiene, and containing 2 to 40 double bonds, preferably 4 to 40 double bonds, per 1000 monomeric units in the copolymer.

The amount of the diolefin in the above copolymer can be varied according to the types of the olefin and the diolefin.

Examples of the $\alpha$-olefins with 3 to 8 carbon atoms are propylene, butene-1 and 4-methyl-1-pentene.

Preferably, the copolymer has a viscosity average molecular weight of about 10,000 to about 1,000,000. More preferably, the copolymer has an apparent density of about 0.20 to about 0.32 g/cm$^3$, and a melt index of about 3 to about 5.

If the number of the double bonds per 1000 monomeric units, especially per 1000 monomeric units out of the entire monomeric units present in the main polymer chain, is smaller than the lower limit specified above, it is difficult to obtain graft copolymers having satisfactorily improved properties.

The copolymers of α-olefins and diolefins can be obtained by any methods which have heretofore been known in the art. In particular, when an α-olefin is copolymerized with a diolefin in the presence of a catalyst composed of an organometallic compound and a halogen compound of a transition metal supported on a solid carrier, the copolymerization reaction proceeds easily, and the content of the diolefin in the copolymer can be easily adjusted. Various metal compounds can be used as the solid carrier in the above-cited process, but magnesium-containing compounds are especially preferred.

Examples of the magnesium-containing compound useful as the carrier in the invention include hydrocarbon-insoluble inorganic compounds in finely divided form, such as magnesium oxide, magnesium hydroxide, magnesium chloride, magnesium oxychloride, magnesium carbonate, and basic magnesium carbonate. Magnesium chloride is preferred, and magnesium oxide is more preferred. Compounds containing magnesium and other metal atom, such as magnesium aluminate, can also be used. The catalyst carrier should have a specific surface area of at least 10 m$^2$/g, preferably 20 to 200 m$^2$/g, and an average particle diameter of 0.1 to 150 microns.

Preferably, the carrier is treated with an electron donor prior to supporting the titanium and/or vanadium halogen compounds. The electron donor is either liquid or gaseous under the treating conditions, and includes, for example, aliphatic carboxylic acids, aromatic carboxylic acids, alkyl esters of aliphatic carboxylic acids, alkyl esters of aromatic carboxylic acids, aliphatic ethers, cyclic ethers, aliphatic ketones, aromatic ketones, aliphatic aldehydes, aliphatic alcohols, aliphatic acid halides, aliphatic nitriles, aromatic nitriles, aliphatic amines, aromatic amines, aliphatic phosphines and aromatic phosphines. Examples of suitable electron donors are aliphatic carboxylic acids such as acetic acid, propionic acid, valeric acid or acrylic acid; aromatic carboxylic acids such as benzoic acid, or phthalic acid; aliphatic carboxylic acid esters such as methyl formate, dodecyl formate, ethyl acetate, butyl acetate, vinyl acetate, methyl acrylate, octyl butyrate, ethyl laurate or octyl laurate; aromatic carboxylic acid esters such as methyl benzoate, ethyl benzoate, octyl parahydroxybenzoate, or dioctyl phthalate; aliphatic ethers such as ethyl ether, hexyl ether, allylbutyl ether or methyl undecyl ether; cyclic ethers such as tetrahydrofuran, dioxane or trioxane; aliphatic amines such as methylamine, diethylamine, tributylamine, octylamine or dodecylamine; aromatic amines such as pyridine, aniline or naphthylamine; aliphatic ketones such as acetone, methyl isobutyl ketone, ethyl butyl ketone or dihexyl ketone; aliphatic aldehyde such as propionaldehyde; aliphatic alcohols such as methanol, ethanol, isopropanol, hexanol, 2-ethyl hexanol, octanol, or dodecanol; aliphatic nitriles such as acetonitrile, valeronitrile or acrylonitrile; aromatic nitriles such as benzonitrile or phthalonitrile; aliphatic acid amides such as acetamide; and phosphines such as triethyl phosphine or triphenyl phosphine.

The treatment of the carrier with the electron donor may be performed by contacting the carrier intimately with the electron donor at a temperature below the decomposition temperature of the carrier.

Suitable halogen compounds of transition metals are halogen compounds of titanium and/or vanadium. The preferred halogen compounds of titanium and/or vanadium are titanium tetrachloride, titanium tetrabromide, monoalkyl trichlorotitanates, dialkyl dichlorotitanates, vanadium tetrachloride, and vanadium oxytrichloride.

The titanium or vanadium halogen compound may be supported on the carrier by a variety of methods which include, for example, the immersion of the carrier or one pre-treated with an electron donor defined above in liquid titanium or vanadium halogen compound, the immersion of the carrier or the pre-treated one in a solution or suspension in a solvent of the titanium or vanadium halogen compound, the passing of a vapor of the titanium or vanadium halogen compound through a bed of the carrier or the pre-treated one, and the copulverization treatment of the carrier together with the vanadium or titanium halogen compound.

The organoaluminum compound to be combined with the halogen compound of titanium and/or vanadium supported on the carrier preferably includes, for example, trialkyl aluminums such as triethyl aluminum, triisobutyl aluminum or trihexyl aluminum; dialkyl aluminum halides such as diethylaluminum chloride; alkylaluminum sesquihalides such as ethylaluminum sesquichloride; alkylaluminum dihalides such as ethylaluminum dichloride, ethylaluminum difluoride or butylaluminum dichloride; and dialkylaluminum alkoxides such as diethylaluminum ethoxide, diethylaluminum butoxide or diethylaluminum phenoxide.

The ratio of the aluminum component to the component supported on the carrier is preferably 100/1 – 1/1 in terms of the atomic ratio of the aluminum atom to the titanium and/or vanadium atom.

The copolymerization reaction between the α-olefin and the diolefin is carried out in the same way as in an ordinary Ziegler-type polymerization. In other words, it is carried out by adding a catalyst to a suitable inert solvent, and feeding an α-olefin and a diolefin into this system. The inert solvent that can be used includes, for example, a saturated aliphatic hydrocarbon such as hexane, heptane or kerosene, an aromatic hydrocarbon such as benzene, toluene or xylene, or an alicyclic hydrocarbon such as cyclohexane.

The suitable amount of the catalyst to be used is such that the proportion of the organoaluminum compound is 1 to 20 mols per mol of the titanium atom of the titanium compound supported on the carrier. Furthermore, it is preferred that the proportion of the organoaluminum compound is 0.1 to 10 millimols per liter of the inert solvent. It is suitable to carry out the polymerization at a temperature of 0° to 100°C., but it is also possible to carry it out at a temperature of as high as 100° to 300°C. and a pressure of as high as 10 to 100 Kg/cm$^2$.

According to the process of this invention, the copolymer and a monomer capable of radical graft-copolymerizable with the copolymer are subjected to a suspension polymerization in the presence of a radical initiator. This suspension graft copolymerization is carried out in an inert organic solvent capable of dissolving the grafting comonomer but incapable of dissolving the copolymer and of reacting with the comonomer and the copolymer. The suspension graft copolymerization is carried out at a temperature at which the copolymer is not melted. The melting temperature of the copolymer cannot be unequivocally determined since it varies according to the type of the copolymer, but usually, it is within the range of about 60°C. to about 90°C.

According to the process of this invention, the starting copolymer is suspended in the inert organic solvent, and the graft copolymerization is carried out while the copolymer is not dissolved in, or swollen with, this solvent.

Examples of suitable grafting comonomers that can be used in this invention are vinyl monomers such as acrylic acid, its alkyl esters containing 1 to 8 carbon atoms in the alkyl moiety, methacrylic acid, its alkyl esters containing 1 to 8 carbon atoms in the alkyl moiety, glycidyl acrylate, glycidyl methacrylate, acrylamide, methacrylamide, N,N-dimethyl acrylamide, N,N-dimethyl methacrylamide, acrylonitrile, methacrylonitrile and styrene, and carboxylic acids or its derivatives, such as maleic acid, maleic anhydride, $C_1$ to $C_8$ alkyl monoesters or diester of maleic acid, maleimide, maleic acid monoamide, maleic acid diamide, citraconic anhydride, and 5-norbornene-2,3-dicarboxylic anhydride.

Of these grafting comonomers, maleic anhydride, citraconic anhydride, 5-norbornene-2,3-dicarboxylic anhydride, and the above vinyl monomers excepting acrylonitrile, methacrylonitrile and styrene are especially preferred.

The inert organic solvent used in the process of this invention should have the properties specified above, and all solvents which are liquid under the reaction conditions can be used. Examples of the inert organic solvents are aromatic hydrocarbons, halogenated aromatic hydrocarbons, organic acids, organic acid anhydrides, organic acid esters, and alicyclic hydrocarbons. Of these, the organic acid anhydrides, lower alkyl esters thereof, benzene or its chloro- or alkyl-derivatives, cyclohexane and its chloro- or alkyl-derivatives, are preferred. More specific examples are glacial acetic acid, acetic anhydride, methyl acetate, ethyl acetate, butyl acetate, benzene, toluene, xylene, chlorobenzene, cyclohexane, methyl cyclohexane, and chlorocyclohexane. If an aliphatic hydrocarbon such as hexane, heptane, diesel oil or kerosene is used as a solvent, only low grafting yields can be achieved.

The radical initiator that can be used in this invention may be an organic peroxide and an azonitrile. The organic peroxides may be those of the aliphatic hydrocarbon, aromatic hydrocarbon, carboxylic acid ester, ketone, or carbonic acid ester types, and specific examples include diisopropyl peroxide, ditertiary butyl peroxide, tertiary butyl hydroperoxide, dicumyl peroxide, dibenzoyl peroxide, cumyl hydroperoxide, tertiary butyl peracetate, tertiary butyl peroxy laurate, tertiary butyl perbenzoate, ditertiary butyl perphthalate, methylethylketone peroxide, octanol peroxide, and diisopropyl peroxycarbonate. Examples of the azonitrile are azobisisopropionitrile and azobisisobutyronitrile.

The amount of the radical initiator is preferably about 0.02 to about 5% by weight, more preferably about 0.1 to about 1% by weight, based on the starting olefin copolymer, for example, an ethylene/butadiene copolymer.

The suspension graft copolymerization reaction of this invention can be performed, for example, by adding 100 parts by weight of the starting olefin copolymer and about 1 to about 100 parts by weight of a radical graft-copolymerizable comonomer, and heating them in about 200 to about 500 parts by volume, per 100 parts by weight of the starting copolymer, of the inert organic solvent in the presence of the radical initiator, to a temperature of about 60° to about 90°C. Preferably, the amount of the inert organic solvent is about 3 to 10 parts per part of the starting olefin copolymer. The reaction temperature should be selected so that the starting copolymer is present in the suspended state in the reaction system and is not half melted nor melted completely. Temperatures at which the starting olefin copolymer is half melted or completely melted cause gellation of the starting olefin copolymer as a result of a crosslinking reaction, and make the operation difficult. It is important therefore to prescribe the reaction temperature so that the reaction system can be maintained in the suspended state.

The graft copolymer formed by the suspension graft copolymerization in accordance with the process of this invention can be easily separated and recovered by filtration or other solid-liquid separating procedures.

The polyolefin graft copolymers obtained by the process of this invention exhibit good improvements in their properties considered as dependent upon the polarity of the surface and interface of polyolefin, such as adhesiveness, printability, dyeability, hydrophilicity, antistatic properties, soiling resistance, blocking resistance, platability, dispersibility of an additive therein and its retention. Furthermore, chemical reactivity ascribable to the introduction of various organic groups can also be imparted to the polyolefin graft copolymers. Accordingly, the polyolefin graft copolymers obtained by the process of this invention can be subjected to various secondary chemical treatments in order to further improve any of the desired one of the above properties.

These improved properties of the polyolefin graft copolymers in accordance with this invention make them useful in various applications; for example, they can be used for producing bondable assembling rods or plates, printable automatic packaging films having resistance to blocking, soil-resistant shaped articles, or colored shaped articles which permit good dispersion of a pigment and an antistatic agent, and are free from non-uniformity in color with reduced dissipation of the antistatic agent caused by bleed-out.

It is also possible to apply various organic chemical means to the hydroxyphenyl group, mercaptophenyl group, carboxyphenyl group, sulfophenyl group, hydrocarbyloxyphenyl group, combinations of these groups, $\alpha\beta$-unsaturated carboxylic acid residues or residues of the derivatives of these carboxylic acids which have been introduced into the olefin copolymer, in order to improve the characteristics of the polyolefin graft copolymer further. Moreover, such an introduced group can be converted to a different group. The latter method is especially useful for introducing a modifying component which is difficult to bond directly with good efficiency to the starting olefin copolymer. In this case, first an easily introduceable modifying component is introduced into the starting olefin copolymer, and then converted to the desired group. This can render the process of this invention applicable to a wider range.

The following Examples and Comparative Examples illustrate the process of this invention in greater detail.

EXAMPLE 1

Preparation of Starting Copolymer

Magnesium oxide was immersed in water at 95°C. and stirred for 3 hours at this temperature, followed by filtration, and vacuum drying at 80°C. for 24 hours to form magnesium hydroxide. The resulting magnesium hydroxide was heat-treated in a stream of nitrogen at 400°C. for 30 minutes. The heat-treated product was suspended in titanium tetrachloride, and the suspension was stirred at 130°C. for 1 hour, followed by filtration. The cake was washed with refined hexane until there was no appreciable chlorine in the wash liquid, and then dried. All of the above steps were performed in an atmosphere of nitrogen in the absence of moisture.

Using 0.5 g (0.2 m-mol calculated as titanium atom) of the resulting catalyst component and 1 m-mol of triethyl aluminum, 100 parts by volume of ethylene and 20 parts by volume of butadiene were polymerized for 5 hours in kerosene at 60°C. and a total pressure of 8 Kg/cm$^2$ (hydrogen partial pressure 4 Kg/cm$^2$). The resulting copolymer was filtered, and dried. The ethylene/butadiene copolymer obtained had a melt index of 2.5 and contained 6 double bonds per 1000 carbon atoms, most of which were of the trans-vinylene type.

Modification

An autoclave having an effective capacity of 2 liters was charged with 1 liter of reagent-grade ethyl acetate, and 300 g of the resulting ethylene/butadiene copolymer was suspended, after which 30 g of reagent-grade maleic anhydride and 2 g of reagent-grade benzoyl peroxide were further added. Then, the gaseous phase of the autoclave was replaced by nitrogen. They were stirred for 3 hours at 90°C., and cooled. The resultant solid graft copolymer was recovered by filtration, and washed with acetone several times. The graft copolymer had a melt index of 1.5. The amount of the maleic anhydride grafted could not be determined by infrared absorption spectrum (because the absorption at 1770 cm$^{-1}$ ascribable to a carbonyl group was saturated, i.e., scaled out). When the amount was calculated from the oxygen content (1.2% by weight) determined by elemental analysis, it was about 2.4% by weight.

A degreased iron plate (14 cm in length, 14 cm in width and 1 mm in thickness) was laminated with the resulting graft copolymer to form a laminate using a press former at 200°C. and 50 Kg/cm$^2$. The thickness of the graft copolymer layer was 1 mm.

A test piece with a width of 2 cm was cut off from the resulting laminate, and its peel strength was measured at a pulling speed of 50 mm/min. at 23°C. with a peeling angle of 180°. It was found that this test piece had a peel strength of 3.0 Kg/cm.

COMPARATIVE EXAMPLE 1

Example 1 was repeated except that hexane was used as a reaction medium. The infrared absorption spectrum of the resulting polymer showed that there was hardly any absorption in the vicinity of 1770 cm$^{-1}$.

A peeling test was performed in the same way as in Example 1 on the resulting copolymer, and it was found to have a peel strength of 0 Kg/cm.

COMPARATIVE EXAMPLE 2

Preparation of Starting Copolymer

Ethylene and butadiene were copolymerized in the same way as in Example 1 except that 10 m-mols/liter of titanium trichloride (AA Grade, a product of Toyo Stauffer Company) was used instead of the titanium catalyst component prepared in Example 1. After polymerization, the catalyst was decomposed with methanol, and after filtration, the cake was washed with methanol several times. The resulting polymer contained 0.8 double bond per 1000 carbon atoms, and had a melt index of 0.12.

Modification

Grafting reaction of maleic anhydride was attempted using the resulting polymer under the same conditions as in Example 1. However, the maleic anhydride could hardly be grafted onto the polymer.

EXAMPLE 2

A three-necked flask having an effective capacity of 2 liters and equipped with a stirring rod was charged with 200 g of the ethylene/butadiene copolymer obtained in Example 1, and then 20 g of maleic anhydride was added. The gaseous phase of the flask was replaced by nitrogen, and then, 1 liter of nitrogen-purged glacial acetic acid and 2 ml. of tertiary butyl peroxylaurate (Perbutyl L, a trademark for a product of Nippon Yushi Kabushiki Kaisha) were added. The reaction was performed at 90°C. for 10 hours. The resulting polymer was filtered by means of a glass filter, and the cake was washed with acetone several times to remove the unreacted maleic anhydride. There was obtained a copolymer with maleic anhydride grafted thereto. The grafted copolymer had a melt index of 1.26. Its infrared absorption spectrum showed that the amount of the maleic anhydride grafted was 0.8% by weight.

A peeling test was performed in the same way as in Example 1 on the resulting copolymer, and it was found to have a peel strength of 1.2 Kg/cm.

EXAMPLE 3

Preparation of Starting Copolymer

Commercially available anhydrous magnesium chloride was calcined in a stream of nitrogen at 300°C. for 6 hours. 9.5 g of the heat-treated magnesium chloride was added to dehydrated hexane containing 10 m-mols of dehydrated methanol suspended therein in an atmosphere of nitrogen. The mixture was heat-treated at 50°C. for 30 minutes. Then, the heat-treated product was dried at reduced pressure to obtain MgCl$_2$.1/10 MeOH (Me is a methyl group). This alcohol adduct of magnesium chloride was suspended in titanium tetrachloride, and the mixture was stirred for 1.5 hours at 125°C. The suspension was hot filtered, and the cake was washed with refined hexane until there was no appreciable chlorine in the wash liquid, followed by drying. All of the above steps were performed in an atmosphere of nitrogen.

An autoclave having an effective capacity of 3 liters was charged with 1 liter of hexane as a polymerization solvent, and then 500 mg (0.6 m-mol calculated as the titanium atom) of the titanium catalyst component prepared above and 1 m-mol of triethyl aluminum were added. Polymerization was carried out at 80°C. for 5 hours while continuously feeding 100 parts by volume of ethylene and 3 parts by volume of butadiene. The resulting polymer had a viscosity average molecular weight of 800,000 and contained 20 double bonds per 1,000 carbon atoms.

Modification

A 2-liter three-necked flask equipped with a stirring rod was charged with 400 g of the ethylene/butadiene copolymer obtained above, 60 g of maleic anhydride and 2 g of azobisisobutyronitrile. Then, the gaseous phase of the flask was replaced by nitrogen. One liter of commercially available reagent-grade acetic anhydride was added, and the reaction was performed for 1 hour at 70°C. The resulting graft copolymer was filtered on a glass filter, and washed with acetone several times. Elemental analysis showed that the resulting polymer contained about 10% by weight of maleic anhydride grafted thereto.

EXAMPLE 4

An autoclave having an effective capacity of 2 liters was charged with 1 liter of commercially available reagent-grade benzene, and 300 g of the ethylene/butadiene copolymer obtained in Example 1 was suspended in it. Furthermore, 30 g of reagent-grade maleic anhydride and 2 g of reagent-grade benzoyl peroxide were added to the suspension, and the gaseous phase of the autoclave was replaced by nitrogen. They were stirred for 3 hours at 90°C. and cooled. The resulting solid graft copolymer was recovered by filtration, and washed with acetone several times. The polymer had a melt index of 1.5. The amount of the maleic anhydride grafted could not be determined by infrared absorption spectrum analysis because the absorption at 1770 cm$^{-1}$ ascribable to a carbonyl group was saturated, i.e. sealed out. Therefore, it was calculated from the oxygen content (1.8% by weight) measured by elemental analysis, and found to be about 3.6% by weight.

COMPARATIVE EXAMPLE 3

Grafting reaction of maleic anhydride was attempted under the same conditions as in Example 4 using the polymer obtained in Comparative Example 2. It was found that the resulting polymer scarcely contained maleic anhydride grafted thereto.

EXAMPLE 5

A three-necked flask having an effective capacity of 2 liters and equipped with a stirring rod was charged with 200 g of the ethylene/butadiene polymer obtained in Example 1, and 20 g of maleic anhydride was added. The gaseous phase of the flask was replaced by nitrogen, and 1 liter of nitrogen-purged toluene and 2 ml. of tertiary butyl peroxylaurate (Perbutyl L, a trademark for a product of Nippon Yushi Kabushiki Kaisha) were added. The reaction was performed at 90°C. for 10 hours. The resulting graft copolymer was filtered by means of a glass filter, and washed with acetone several times to remove the unreacted maleic anhydride. There was obtained a copolymer having maleic anhydride grafted thereto. This graft copolymer had a melt index of 1.01. The amount of the maleic anhydride grafted, as determined by infrared absorption spectrum analysis, was 1.2% by weight.

EXAMPLE 6

A 2-liter three-necked flask equipped with a stirring rod was charged with 400 g of the ethylene/butadiene copolymer obtained in Example 3, and 60 g of maleic anhydride and 2 g of azobisisobutyronitrile, and then the gaseous phase of the flask was replaced by nitrogen. One liter of commercially available reagent-grade mixed xylene was added, and the reaction was performed at 70°C. for 1 hours. The resulting graft copolymer was filtered on a glass filter, and washed with acetone several times. The elemental analysis of the resulting polymer showed that about 12% by weight of the maleic anhydride was grafted to the copolymer.

EXAMPLE 7

Preparation of Starting Copolymer

Magnesium oxide was immersed in water at 95°C., and stirred for 3 hours at this temperature, after which it was filtered and dried in vacuo at 80°C. for 24 hours to form magnesium hydroxide. The resulting magnesium hydroxide was heat-treated in a stream of nitrogen at 400°C. for 30 minutes. The heat-treated product was suspended in titanium tetrachloride, and the suspension was stirred for 1 hour at 130°C., followed by filtration. The cake was washed with refined hexane until there was no appreciable chlorine in the wash liquid, and then dried. All of the above steps were performed in an atmosphere of nitrogen in the absence of moisture.

Using 0.5 g (0.2 m-mol calculated as titanium atom) of the catalyst component obtained by the above procedure and 1 m-mol of triethyl aluminum, 100 parts by volume of ethylene and 20 parts by volume of butadiene were polymerized in kerosene at 60°C. and a total pressure of 8 Kg/cm$^2$ (hydrogen partial pressure 4 Kg/cm$^2$) for 5 hours. The resulting copolymer was filtered, and dried. The ethylene/butadiene copolymer obtained had a melt index (MI) of 2.5 and contained 6 double bonds per 1000 monomeric units, most of which were of the trans-vinylene type.

Modification

A 2-liter three-necked flask was charged with 1 liter of reagent-grade toluene, and 300 g of the ethylene/butadiene copolymer obtained above was suspended in it. Methyl methacrylate (60 g) and 2 ml. of reagent-grade tertiary butyl peroxylaurate were further added, and the gaseous phase of the flask was replaced by nitrogen. They were stirred for 5 hours at 90°C., and cooled. The resulting solid graft copolymer was recovered by filtration, and washed with acetone several times. The resulting modified polymer weighed 305 g. The unit of the methyl methacrylate in the copolymer as determined by elemental analysis was about 2% by weight, and it was assumed that about 20% by weight of the methyl methacrylate used was grafted.

In order to determine the presence or absence of a homopolymer of methyl methacrylate in the modified polymer, the polymer was extracted with acetone at the boiling point of the acetone for 24 hours. As a result, about 0.3% by weight of a polymeric substance was extracted. The infrared absorption spectrum of this substance showed that it was a low-molecular-weight polyethylene to which methyl methacrylate had been grafted. The modified polymer as an extraction residue was further subjected to elemental analysis, and about 2% by weight of methyl methacrylate was still detected. This experiment therefore shows that a homopolymer of the methyl methacrylate was substantially not formed.

COMPARATIVE EXAMPLE 4

Example 7 was repeated except that powdery high density polyethylene (Hizex 5000 P, a registered trademark for a product of Mitsui Petrochemical Industries, Ltd.) was used instead of the ethylene/butadiene copolymer. The resulting polymer was extracted with acetone, and analyzed by an infrared absorption spectrum. It was found that methyl methacrylate was scarcely grafted.

EXAMPLE 8

Preparation of Starting Copolymer

A 2-liter autoclave was charged with 1 liter of kerosene, and then 20 m-mols of titanium trichloride (AA Grade, a product of Toyo Stauffer Company) and 20 m-mols of diethyl aluminum chloride were further added. 100 parts by volume of propylene and 40 parts by volume of butadiene were fed and polymerized at 60°C. for 10 hours. The resulting copolymer was filtered, dried, and extracted with hot hexane using a Soxhlet extractor to remove the hot hexane-soluble portion. The resulting propylene/butadiene copolymer contained about 4 double bonds per 500 propylene units, most of which were of the trans-vinylene type.

Modification

An autoclave having an effective capacity of 2 liters was charged with reagent-grade ethyl acetate, and 200 g of the propylene/butadiene copolymer obtained above was suspended in it. Furthermore, 20 g of reagent-grade glycidyl methacrylate and 0.5 g of azobisisobutyronitrile were added. The gaseous phase of the autoclave was replaced by nitrogen. They were stirred for 8 hours at 90°C., and cooled. The resulting solid modified polymer was recovered by filtration, and washed with acetone several times. Infrared absorption spectrum analysis showed that the unit of the glycidyl methacrylate in the copolymer was about 4.0% by weight, and it is assumed that about 4.0% by weight of the glycidyl methacrylate was polymerized.

When the resulting copolymer was extracted with acetone for 24 hours, low-molecular-weight polypropylene having grafted thereto 0.6% by weight of glycidyl methacrylate was extracted. The solid polymer as an extraction residue still contained 3.90% by weight of glycidyl methacrylate grafted thereto. Thus, in this case, it was confirmed that a homopolymer of glycidyl methacrylate was not substantially formed.

A peeling test was performed in the same way as in Example 1 on the resulting graft copolymer, and it was found to have a peel strength of 2.5 Kg/cm.

EXAMPLE 9

Preparation of Starting Copolymer

Commercially available anhydrous magnesium chloride was calcined in a stream of nitrogen at 300°C. for 6 hours. 9.5 g of the heat-treated magnesium chloride was added to dehydrated hexane containing 10 m-mols of dehydrated methanol suspended therein, and the mixture was heat-treated at 50°C. for 30 minutes. It was then dried at reduced pressure to form $MgCl_2 \cdot 1/10$ MeOH (Me is a methyl group). This alcohol adduct of magnesium chloride was suspended in titanium tetrachloride, and the suspension was stirred for 1.5 hours at 125°C. The suspension was hot filtered, and the filtrate was washed with refined hexane until there was no appreciable chlorine in the wash liquid, followed by drying. All of the above steps were performed in an atmosphere of nitrogen.

An autoclave having an effective capacity of 2 liters was charged with 1 liter of hexane as a polymerization solvent, and 500 mg (0.6 m-mol calculated as the titanium atom) of the titanium catalyst component prepared above and 1 m-mol of triethyl aluminum were added. 500 g of 4-methyl-1-pentene was fed into the autoclave, and the temperature was raised to 60°C. Polymerization was performed at 60°C. for 12 hours while continuously feeding butadiene at a rate of 10 liters per hour. The resulting copolymer was filtered, dried, and extracted with hot hexane using a Soxhlet extractor to remove the hot hexane-soluble portion. The polymer as an extraction residue had a viscosity average molecular weight of 600,000 and contained 15 double bonds per 500 monomeric units.

Modification

A 2-liter three-necked flask equipped with a stirring rod was charged with 200 g of the resulting 4-methyl-1-pentene/butadiene copolymer, 100 g of methacrylonitrile and 2 g of benzoyl peroxide. Then, the gaseous phase was replaced by nitrogen. They were stirred for 12 hours at 70°C., and cooled. There was obtained 205 g of a solid modified polymer which was recovered by filtration. The modified polymer was immersed in dimethyl formamide, and allowed to stand for 2 days at room temperature. The polymer was further washed with dimethyl formamide several times, and then with acetone, followed by drying. The infrared absorption spectrum of the resulting polymer showed that an absorption ascribable to a nitrile group was observed in the vicinity of 2220 $cm^{-1}$. The elemental analysis of the polymer showed that it contained 1.2% by weight of nitrogen. From these data, it will be seen that about 6.6% by weight of methacrylonitrile was copolymerized in this polymer.

What we claim is:

1. A process for preparing a polyolefin graft copolymer, which comprises subjecting a copolymer selected from the group consisting of copolymers of ethylene with diolefins and copolymers of $C_3$ to $C_8$ α-olefins with diolefins and containing 2 to 40 double bond per 1000 monomeric units therein and a monomer radical graft-copolymerizable onto said copolymer to a suspension graft copolymerization in the presence of a radical initiator in an inert organic solvent capable of dissolving said radical-polymerizable monomer but incapable of dissolving said graft copolymer and of reacting therewith, at a temperature at which said copolymer is not melted.

2. The process of claim 1 wherein said radical graft-copolymerizable monomer is a vinyl monomer selected from the group consisting of acrylic acid, $C_1$ to $C_8$ alkyl esters thereof, methacrylic acid, $C_1$ to $C_8$ alkyl esters thereof, glycidyl acrylate, glycidyl methacrylate, acrylamide, methacrylamide, N,N-dimethyl acrylamide, N,N-dimethyl methacrylamide, acrylonitrile, methacrylonitrile and styrene.

3. The process of claim 1 wherein said radical graft-copolymerizable monomer is a carboxylic acid or its derivative selected from the group consisting of maleic acid, maleic anhydride, $C_1$ to $C_8$ alkyl monoesters of maleic acid, $C_1$ to $C_8$ alkyl diesters of maleic acid, maleimide, maleic acid monoamide, maleic acid diamide, citraconic anhydride and 5-norbornene-2,3-dicarboxylic anhydride.

4. The process of claim 1 wherein said inert organic solvent is a member selected from the group consisting of aromatic hydrocarbons, halogenated aromatic hydrocarbons, aliphatic carboxylic acids, aliphatic carboxylic anhydrides, $C_1$ to $C_8$ alkyl esters of aliphatic carboxylic acids and alicyclic hydrocarbons.

5. The process of claim 1 wherein said diolefin is butadiene.

6. The process of claim 1 wherein said copolymer is obtained by copolymerizing an α-olefin with a diolefin using a catalyst composed of an organoaluminum compound and a halogen compound of a transition metal supported on a carrier of a magnesium-containing compound.

7. The process of claim 1 wherein said copolymer contains from 4-40 double bonds per 1,000 monomeric units.

8. The process of claim 1 wherein said copolymer is selected from copolymers of α-olefins with 3 to 8 carbon atoms with diolefins wherein said α-olefins are selected from the group consisting of propylene, butene-1 and 4-methyl-1-pentene, and said diolefin is butadiene.

9. The process of claim 1 wherein said copolymer has a viscosity average molecular weight of about 10,000 to about 1,000,000, an apparent density of about 0.20 to about 0.32 g/cm$^3$, and a melt index of about 3 to about 5.

10. The process of claim 1 wherein said radical graft-copolymerizable monomer is a vinyl monomer selected from acrylic acid, $C_1$ to $C_8$ alkyl esters thereof, methacrylic acid, $C_1$ to $C_8$ alkyl esters thereof, glycidyl acrylate, glycidyl methacrylate, acrylamide, methacrylamide, N,N-dimethyl acrylamide and N,N-dimethyl methacrylamide, or a carboxylic acid or its derivative selected from the group consisting of maleic anhydride, citraconic anhydride and 5-norbornene-2,3-dicarboxylic anhydride.

11. The process of claim 4 wherein said inert organic solvent is selected from the group consisting of glacial acetic acid, acetic anhydride, methyl acetate, ethyl acetate, butyl acetate, benzene, toluene, xylene, chlorobenzene, cyclohexane, methyl cyclohexane, and chlorocyclohexane.

12. The process of claim 1 wherein said radical initiator is an organic peroxide selected from the group consisting of diisopropyl peroxide, ditertiary butyl peroxide, tertiary butyl hydroperoxide, dicumyl peroxide, dibenzoyl peroxide, cumyl hydroperoxide, tertiary butyl peracetate, tertiary butyl peroxy laurate, tertiary butyl perbenzoate, ditertiary butyl perphthalate, methylethylketone peroxide, octanol peroxide, and diisopropyl peroxycarbonate.

13. The process of claim 1 wherein said radical initiator is an azonitrile selected from the group consisting of azobisisopropionitrile and azobisisobutyronitrile.

14. The process of claim 12 wherein the amount of said radical initiator is about 0.02 to about 5% by weight based on the starting olefin copolymer.

15. The process of claim 13 wherein the amount of said radical initiator is about 0.02 to about 5% by weight based on the starting olefin copolymer.

16. The process for preparing a polyolefin graft copolymer according to claim 1 which comprises subjecting about 100 parts by weight of said copolymer with about 1 to about 100 parts by weight of said monomer radical graft-copolymerizable onto said copolymer to a suspension graft copolymerization in the presence of a radical initiator in about 200 to about 500 parts by volume per 100 parts by weight of the starting copolymer of said inert organic solvent at a temperature of about 60° to about 90°C.

17. The process of claim 16 wherein said diolefin is butadiene, said α-olefins with 3 to 8 carbon atoms are selected from the group consisting of propylene, butene-1 and 4-methyl-1-pentene, said copolymer contains 4-40 double bonds per 1,000 monomeric units, and has a viscosity average molecular weight of about 10,000 to about 1,000,000, and an apparent density of about 0.20 to about 0.32 g/cm$^3$, and a melt index of about 3 to about 5, said monomer radical graft-copolymerizable onto said copolymer is a vinyl monomer selected from the group consisting of acrylic acid, $C_1$ to $C_8$ alkyl esters thereof, methacrylic acid, $C_1$ to $C_8$ alkyl esters thereof, glycidyl acrylate, glycidyl methacrylate, acrylamide, methacrylamide, N,N-dimethyl acrylamide and N,N-dimethyl methacrylamide, or a carboxylic acid or its derivative selected from the group consisting of maleic anhydride, citraconic anhydride and 5-norbornene-2,3-dicarboxylic anhydride, said inert organic solvent is selected from the group consisting of glacial acetic acid, acetic anhydride, methyl acetate, ethyl acetate, butyl acetate, benzene, toluene, xylene, chlorobenzene, cyclohexane, methyl cyclohexane, and chlorocyclohexane, and the radical initiator is an organic peroxide selected from the group consisting of diisopropyl peroxide, ditertiary butyl peroxide, tertiary butyl hydroperoxide, dicumyl peroxide, dibenzoyl peroxide, cumyl hydroperoxide, tertiary butyl peracetate, tertiary butyl peroxy laurate, tertiary butyl perbenzoate, ditertiary butyl perphthalate, methylethylketone peroxide, octanol peroxide, and diisopropyl peroxycarbonate or an azonitrile selected from the group consisting of azobisisopropionitrile and azobisisobutyronitrile, and is used in an amount of from about 0.02 to about 5% by weight, based on the starting olefin copolymer.

* * * * *